United States Patent
Lu et al.

(10) Patent No.: US 6,317,317 B1
(45) Date of Patent: Nov. 13, 2001

(54) INSERTION CARTRIDGE FOR HARD DISC OF PORTABLE COMPUTER

(75) Inventors: Yu-Kun Lu; Chuan-Yuan Lee; Yu-Tsai Chang; Chia-Ling Wu, all of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/455,360

(22) Filed: Dec. 6, 1999

(51) Int. Cl.$^7$ ................................................ H05K 5/00
(52) U.S. Cl. ........................ 361/685; 361/818; 248/635; 248/611; 367/708.1
(58) Field of Search .................................. 361/685, 686, 361/687, 688, 815, 818, 819; 248/60, 581, 609, 611, 615, 634, 635, 638; 360/97.01, 137; 364/708.1

(56) References Cited

U.S. PATENT DOCUMENTS

| | | | |
|---|---|---|---|
| 6,101,088 | * | 8/2000 | Nakajima et al. .................... 361/686 |
| 6,122,165 | * | 9/2000 | Schmitt et al. ...................... 361/685 |
| 6,122,167 | * | 9/2000 | Schmitt et al. ...................... 361/687 |
| 6,130,817 | * | 10/2000 | Flotho et al. ........................ 361/685 |

* cited by examiner

*Primary Examiner*—Leo P. Picard
*Assistant Examiner*—Hung Van Duong

(57) ABSTRACT

An insertion cartridge for hard disc of a portable computer. The cartridge includes an upper cover and a lower cover mated with each other. Two sides of each of the upper and lower covers are formed with at least one fixing plate. When the upper cover is assembled with the lower cover, the fixing plates are firmly overlapped on each other. After the hard disc is enclosed in the insertion cartridge, the insertion cartridge with the hard disc is fitted into the portable computer and electrically connected with the hard disc connector of the portable computer. Then, the insertion cartridge with the hard disc is locked with the internal component of the portable computer. In addition, multiple resilient plates are disposed on two lateral sides of the lower cover. When the upper and lower covers are assembled, the resilient plates contact with the inner wall of the upper cover to serve as contact points. The contact points cooperate with the contact point between the overlapped fixing plates to form a dense electromagnetic wave protective point for preventing the electromagnetic wave produced inside or outside the hard disc from escaping or intruding.

3 Claims, 4 Drawing Sheets

INSERTION CARTRIDGE FOR HARD DISC OF PORTABLE COMPUTER

BACKGROUND OF THE INVENTION

1. Field of the Invention

The present invention relates to an insertion cartridge for hard disc of portable computer, and more particularly to a hard disc insertion cartridge which can be easily assembled with the portable computer so as to reduce the manufacturing cost of the portable computer. In addition, the insertion cartridge has an electromagnetic wave protection function.

2. Description of the Related Art

The base of a conventional portable computer and the hard disc of the portable computer are manufactured and assembled with each other in such a manner that the bottom of the hard disc is formed with multiple thread holes (generally six, three on each side) for locking the hard disc. The base of the portable computer is also formed with multiple thread holes corresponding to the thread holes of the hard disc. When the hard disc is assembled with the portable computer, screws are screwed into the thread holes to fix the hard disc with the portable computer. According to such assembling procedure, quite a lot of screws must be used to lock the hard disc. In addition, such locking procedure must be performed manually so that it is troublesome to manufacture the portable computer. This leads to high cost for manufacturing the portable computer.

SUMMARY OF THE INVENTION

It is therefore a primary object of the present invention to provide an insertion cartridge for hard disc of portable computer, which facilitates the manufacturing and assembling of the base of the portable computer and the hard disc. The insertion cartridge also reduces the interference of electromagnetic wave with the hard disc in operation and prevents electromagnetic wave from escaping. When assembling the hard disc with the portable computer, the hard disc is first enclosed in the insertion cartridge and then the insertion cartridge with the hard disc is fitted into the portable computer with the connector of the hard disc electrically connected with the hard disc connector of the portable computer. Then, the insertion cartridge with the hard disc is locked with the base of the portable computer by locking members.

It is a further object of the present invention to provide an electromagnetic wave protective insertion cartridge for hard disc of portable computer, which is able to prevent electromagnetic wave from interfering with the hard disc or escaping.

The present invention can be best understood through the following description and accompanying drawings wherein:

DETAILED DESCRIPTION OF THE PREFERRED EMBODIMENT

Figure 1:
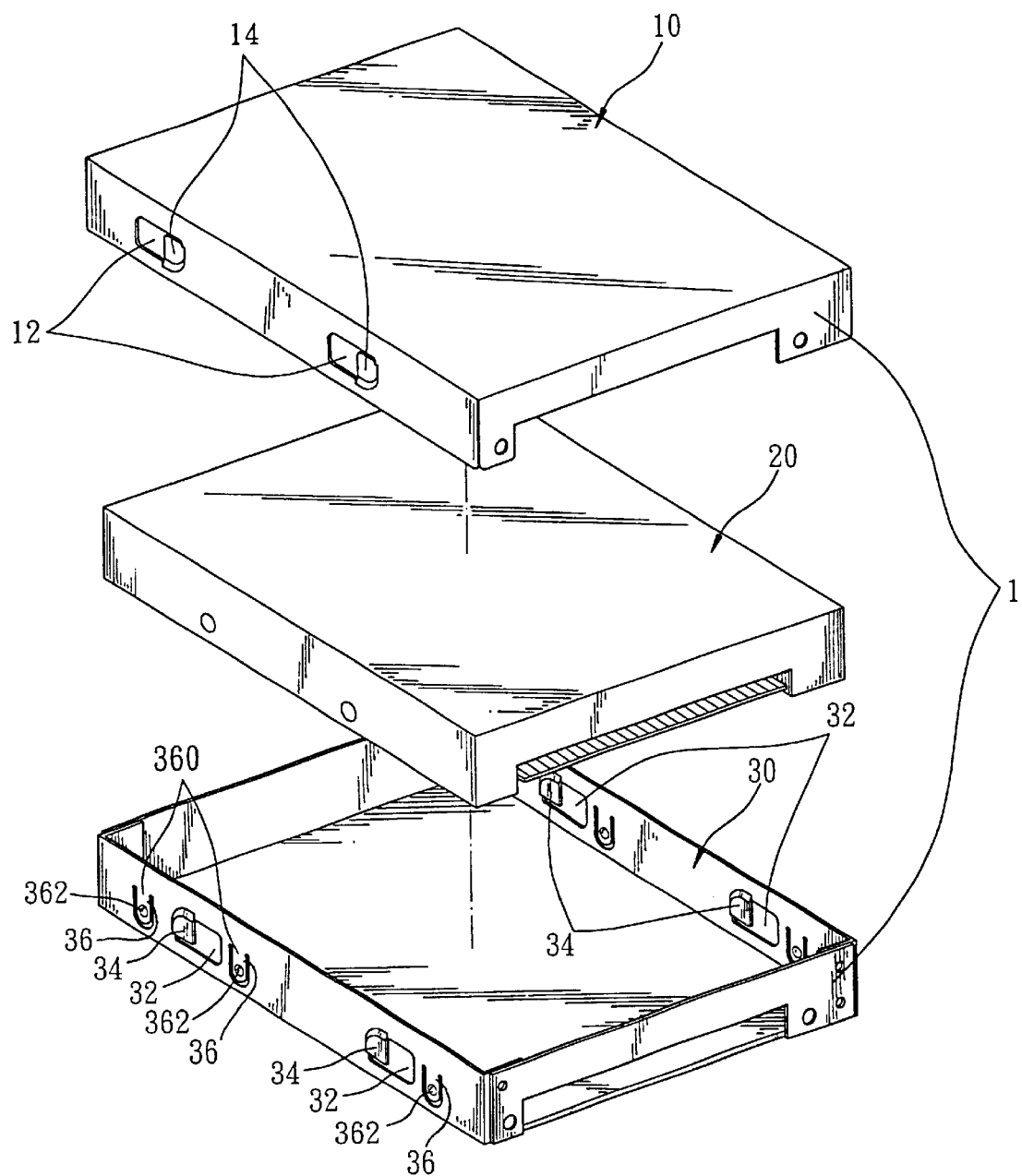
FIG. 1 is a perspective exploded view of the insertion cartridge and the hard disc of portable computer of the present invention, showing the relationship between the positions thereof.

Please refer to FIG. 1. The bard disc insertion cartridge 1 of the present invention includes an upper cover 10 and a lower cover 30.

Two sides of the upper cover 10 are formed with at least one first opening 12. A lateral edge of the first opening 12 is disposed with a first projecting fixing plate 14.

The lower cover 30 is mated with the upper cover 10. Two sides of the lower cover 30 are formed with at least one second opening 32. A lateral edge of the second opening 32 is disposed with a second projecting fixing plate 34.

When the upper cover 10 is assembled with the lower cover 30, the hard disc 20 is first placed into the lower cover 30 and then the upper cover 10 is mated onto the lower cover 30 with the two sides of the upper cover 10 and the lower cover 30 overlapped on each other.

Figure 2:
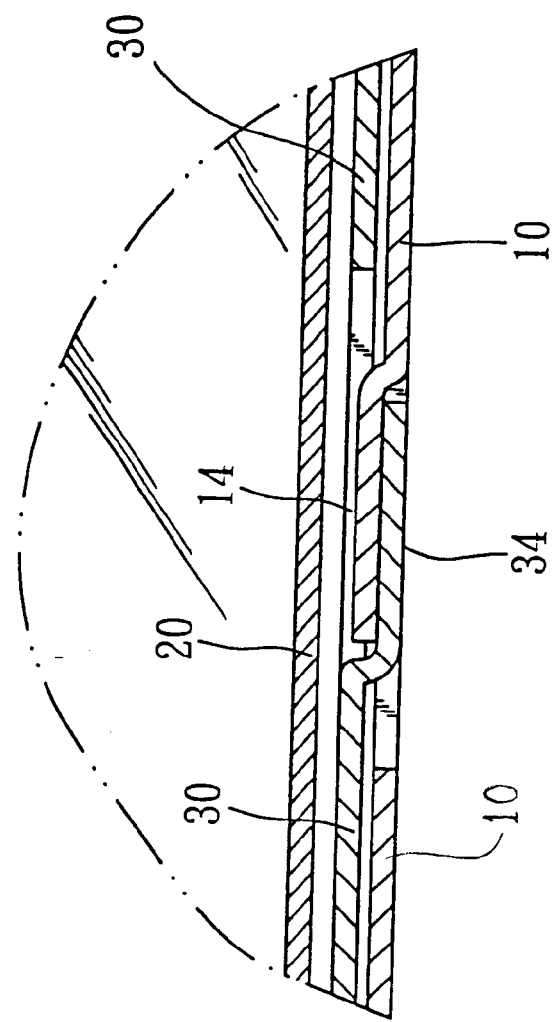
FIG. 2 is a partially sectional view taken along line A—A of FIG. 3, showing the overlapped state of the mated upper and lower covers of the hard disc insertion cartridge of the present invention.

Then a user with a left/right force pushes the upper cover 10 to engage with the lower cover 30. At this time, the second and the first fixing plates 34, 14 are overlapped on each other. Referring to FIG. 2, the first fixing plate 14 of the upper cover 10 is positioned under the second fixing plate 34 of the lower cover 30.

Figure 3:
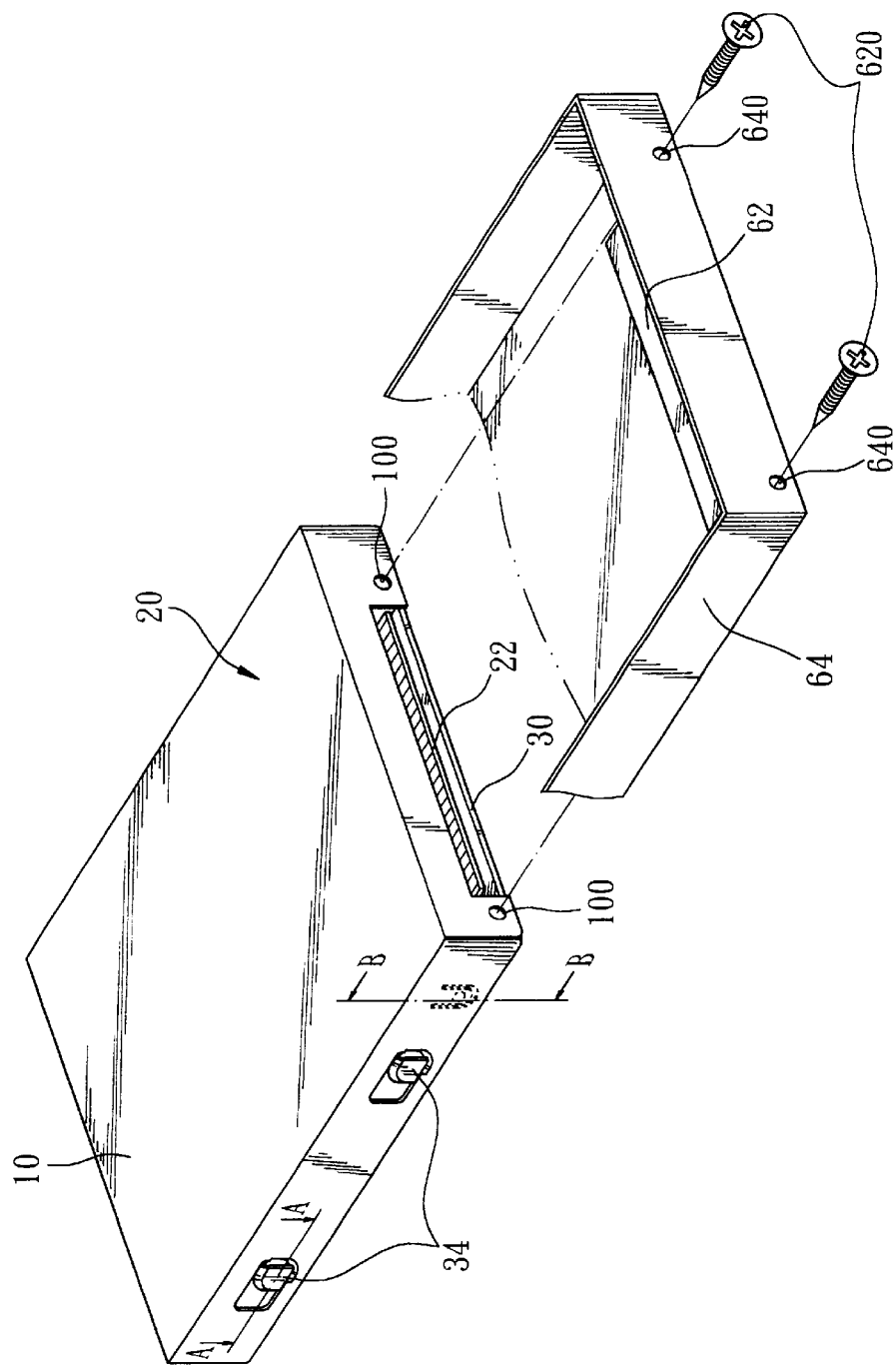
FIG. 3 is a perspective partially exploded view of the insertion cartridge with the hard disc enclosed therein and the cooperative hard disc connector of the portable computer.
Figure 4:
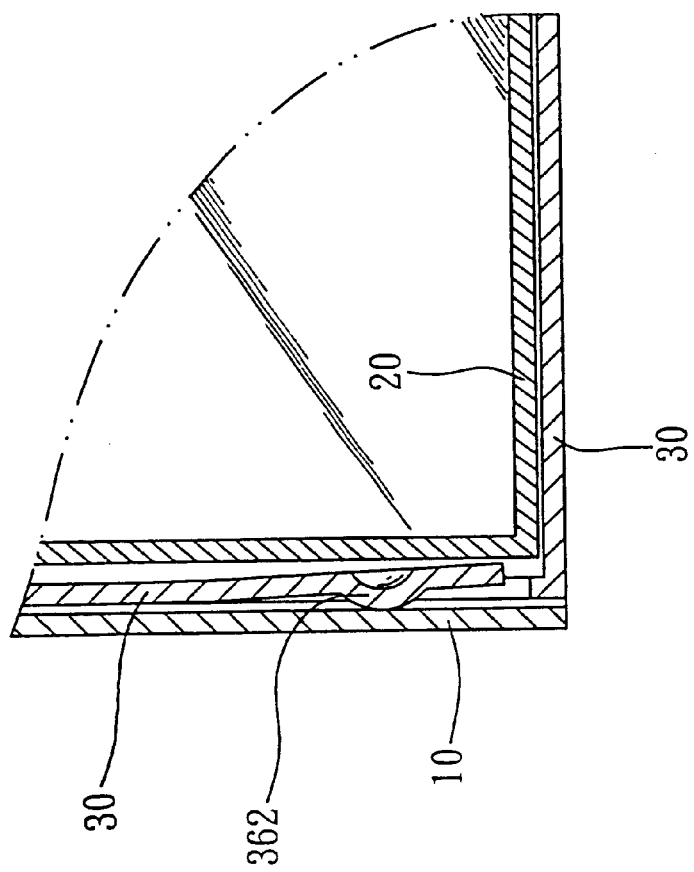
FIG. 4 is a partially sectional view taken along line B—B of FIG. 3, showing the insertion cartridge with the hard disc enclosed therein.

Please refer to FIGS. 1, 3 and 4. In order to prevent the electromagnetic wave produced in operation of the hard disc 20 in the computer from escaping outside, the upper and lower covers 10, 30 are made of metal. (The surface of the hard disc 20 is also made of metal.) In addition, at least one resilient projecting plate 36 is disposed between two lateral sides of the lower cover 30. A fixing end 360 of the resilient projecting plate 36 is fixedly connected with the lateral side of the lower cover 30. The surface of the resilient projecting plate 36 is formed with a protuberance 362 projecting toward the inner wall of the upper cover 10. The resilient projecting plate 36 is slightly inward biased, whereby when the hard disc 20 is placed into the lower cover 30, the protuberance 362 of the resilient projecting plate 36 contacts with the metal surface of the inner wall of the upper cover 10. Accordingly, after the upper and lower covers 10, 30 are mated with each other to enclose the hard disc 20, the contact point of the protuberance 362 and the contact point of the overlapped first and second fixing plates together form a dense electromagnetic wave protective point. This is able to effectively reduce the electromagnetic wave produced by the hard disc and escaping out of the upper and lower covers 10, 30.

After the hard disc insertion cartridge 1 is completely assembled, it is placed into the portable computer and the connector 22 (shown in FIG. 3) of the hard disc 20 is electrically connected with the hard disc connector 62 of the portable computer. In addition, locking members 620 (such as screws) are passed through the thread holes 640 of an internal component 64 of the portable computer and the thread holes 100 of the upper cover 10 to lock the hard disc insertion cartridge 1 with the internal component 64 of the portable computer. Therefore, by a simple step, the hard disc insertion cartridge 1 can be assembled with the portable computer.

The above embodiment is only used to illustrate the present invention, not intended to limit the scope thereof. Many modifications of the above embodiment can be made without departing from the spirit of the present invention.

What is claimed is:

1. An insertion cartridge for a hard disc of a portable computer, the cartridge comprising:

an upper cover, two sides of the upper cover being formed with at least one first opening, a lateral edge of the first opening being disposed with a first projecting fixing plate, the first projecting fixing plate protruding out and extending substantially parallel to the plane of one of the sides of the upper cover; and a lower cover on which a hard disc can rest, the lower two sides of the lower cover being formed with at least one second opening, a lateral edge of the second opening being disposed with a second projecting fixing plate, the second protecting fixing plate protruding and extending substantially parallel to the plane of one of the sides of the lower cover;

wherein when the upper cover is assembled with the lower cover, a hard disc is first placed into the lower cover and then the upper cover is mated onto the lower cover with the two sides of the upper cover and the lower cover overlapped on each other, whereby when a pushing force is applied such that the upper cover engages with the lower cover with the second opening overlaid on the first opening and with the the fixing plates of the upper and lower covers interlocked with each other, thereby locking the upper and lower covers together.

2. An insertion cartridge for a hard disc of a portable computer, the cartridge comprising:

an upper cover, two sides of the upper cover being formed with at least one first opening, a lateral edge of the first opening being disposed with a first projecting fixing plate;

a lower cover on which the hard disc is rested, the lower two sides of the lower cover being formed with at least one second opening, a lateral edge of the second opening being disposed with a second projecting fixing plate, whereby when the upper cover is assembled with the lower cover, the hard disc is first placed into the lower cover and then the upper cover is mated onto the lower cover with the two sides of the upper cover and the lower cover overlapped on each other, a user then with a pushing force making the upper cover engaged with the lower cover with the second opening overlaid on the first opening and with the second and the first fixing plates overlapped on each other; and wherein the upper and lower covers are both made of metal material, at least one resilient projecting plate being disposed between two lateral sides of the lower cover, a surface of the resilient projecting plate being formed with a protuberance projecting toward an inner wall of the upper cover, whereby the protuberance of the resilient projecting plate contacts with the inner wall of the upper cover to serve as a contact point, the contact point cooperating with the contact point between the overlapped first and second fixing plates to form a dense electromagnetic wave protective point for preventing the electromagnetic wave produced inside or outside the hard disc from escaping or intruding.

3. The insertion cartridge as claimed in claim 1, wherein the upper and lower covers are both made of metal material, at least one resilient projecting plate being disposed between two lateral sides of the lower cover, a surface of the resilient projecting plate being formed with a protuberance projecting toward an inner wall of the upper cover, whereby the protuberance of the resilient projecting plate contacts with the inner wall of the upper cover to serve as a contact point, the contact point cooperating with the contact point between the overlapped first and second fixing plates to form a dense electromagnetic wave protective point for preventing the electromagnetic wave produced inside or outside the hard disc from escaping or intruding.

* * * * *